US011511651B2

(12) United States Patent
Kawano

(10) Patent No.: US 11,511,651 B2
(45) Date of Patent: Nov. 29, 2022

(54) VEHICULAR AIR CONDITIONER

(71) Applicant: DENSO CORPORATION, Kariya (JP)

(72) Inventor: Shigeru Kawano, Kariya (JP)

(73) Assignee: DENSO CORPORATION, Kariya (JP)

( * ) Notice: Subject to any disclaimer, the term of this patent is extended or adjusted under 35 U.S.C. 154(b) by 205 days.

(21) Appl. No.: 16/723,862

(22) Filed: Dec. 20, 2019

(65) Prior Publication Data
US 2020/0122614 A1   Apr. 23, 2020

Related U.S. Application Data

(63) Continuation of application No. PCT/JP2018/024210, filed on Jun. 26, 2018.

(30) Foreign Application Priority Data

Jul. 20, 2017 (JP) .............................. JP2017-140678

(51) Int. Cl.
*B60N 2/56* (2006.01)
*B60H 1/00* (2006.01)
*F24F 5/00* (2006.01)

(52) U.S. Cl.
CPC ....... *B60N 2/5671* (2013.01); *B60H 1/00478* (2013.01); *B60N 2/5635* (2013.01); *B60N 2/5692* (2013.01); *F24F 5/0042* (2013.01)

(58) Field of Classification Search
None
See application file for complete search history.

(56) References Cited

U.S. PATENT DOCUMENTS

| 9,050,382 | B2* | 6/2015 | Carr | A61L 9/02 |
| 10,065,544 | B2* | 9/2018 | Joshi | B60N 2/5642 |
| 10,933,780 | B2* | 3/2021 | Rappl | B60H 1/246 |
| 2006/0273646 | A1* | 12/2006 | Comiskey | B60N 2/5657 297/408 |
| 2007/0234742 | A1* | 10/2007 | Aoki | B60H 1/00285 62/3.3 |
| 2011/0039491 | A1* | 2/2011 | Khalifa | F24F 13/04 454/305 |
| 2011/0061403 | A1* | 3/2011 | Jun | B60N 2/5657 165/59 |

(Continued)

FOREIGN PATENT DOCUMENTS

| CN | 101457996 A | 6/2009 |
| CN | 103182972 A | 7/2013 |

(Continued)

*Primary Examiner* — Sarah B McPartlin
(74) *Attorney, Agent, or Firm* — Harness, Dickey & Pierce, P.L.C.

(57) ABSTRACT

A vehicular air conditioner includes a first outlet that blows a conditioned air frontward to flow past a neck part of an occupant on a seat, and a second outlet that is provided below the first outlet and blows the conditioned air upward to flow past an armpit part of the occupant. The second outlet blows the conditioned air to merge with the conditioned air blown from the first outlet. The second outlet blows the conditioned air with an airflow volume larger than an airflow volume of the conditioned air from the first outlet such that the conditioned air blown from the second outlet guides the conditioned air blown from the first outlet to flow along a face of the occupant.

14 Claims, 9 Drawing Sheets

(56) References Cited

U.S. PATENT DOCUMENTS

| | | | |
|---|---|---|---|
| 2013/0165033 A1* | 6/2013 | Fitzpatrick | B60N 2/565 454/120 |
| 2014/0363333 A1 | 12/2014 | Carr | |
| 2015/0329026 A1* | 11/2015 | Hall | B60N 2/5657 297/180.1 |
| 2016/0052362 A1 | 2/2016 | Thomas | |
| 2016/0250905 A1* | 9/2016 | Tanaka | B60N 2/5657 454/75 |
| 2016/0280038 A1 | 9/2016 | Tanaka et al. | |
| 2019/0054796 A1 | 2/2019 | Thomas | |
| 2020/0108753 A1* | 4/2020 | Fujii | B60N 2/5657 |

FOREIGN PATENT DOCUMENTS

| | | |
|---|---|---|
| JP | 2010076652 A | 4/2010 |
| JP | 2015089682 A | 5/2015 |
| JP | 2016043925 A | 4/2016 |
| JP | 2016145015 A | 8/2016 |

\* cited by examiner

VEHICULAR AIR CONDITIONER

CROSS REFERENCE TO RELATED APPLICATIONS

The present application is a continuation application of International Patent Application No. PCT/JP2018/024210 filed on Jun. 26, 2018, which designated the U.S. and claims the benefit of priority from Japanese Patent Application No. 2017-140678 filed on Jul. 20, 2017. The entire disclosures of all of the above applications are incorporated herein by reference.

TECHNICAL FIELD

The present disclosure relates to a vehicular air conditioner that provides a conditioned air to an occupant seated on a seat in a vehicle compartment.

BACKGROUND

A temperature adjusting device blows a conditioned air to an occupant seated on a seat. The temperature adjusting device is provided in a headrest of the seat, and blows out the conditioned air from a vent provided in a front surface of the headrest. The blown air is guided to a neck part of the occupant.

SUMMARY

According to at least one embodiment of the present disclosure, a vehicular air conditioner supplies a conditioned air to an occupant seated on a seat provided in a vehicle compartment. The vehicular air conditioner includes an air conditioning unit that generates the conditioned air adjusted in temperature, a first outlet that blows the conditioned air to flow past a neck part of the occupant frontward of the seat, and a second outlet that is provided below the first outlet and blows the conditioned air upward to flow past an armpit part of the occupant. The second outlet blows the conditioned air to merge with the conditioned air blown from the first outlet. The second outlet blows the conditioned air with an airflow volume larger than an airflow volume of the conditioned air from the first outlet such that the conditioned air blown from the second outlet guides the conditioned air blown from the first outlet to flow along a face of the occupant.

DETAILED DESCRIPTION

Figure 1:
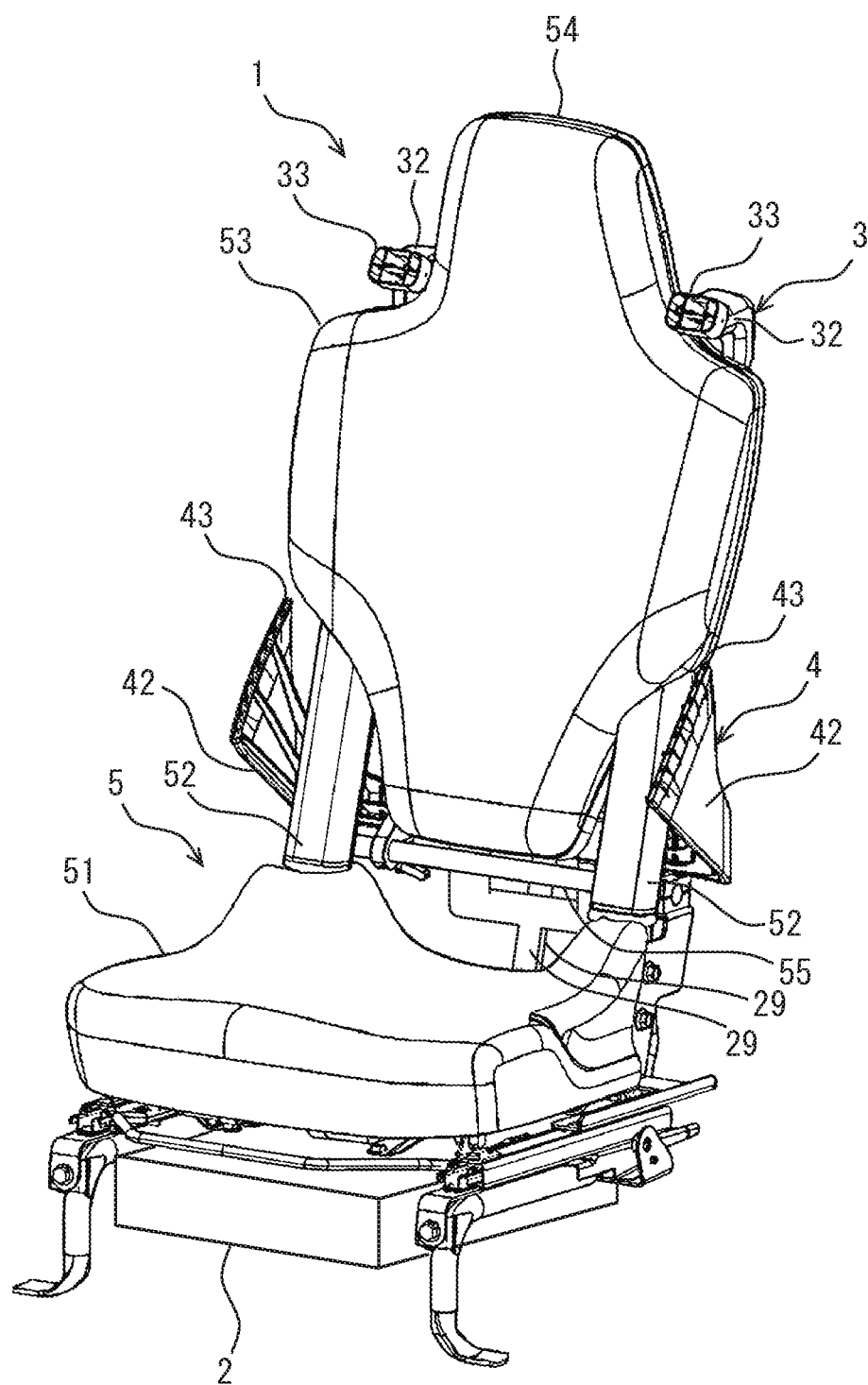
FIG. 1 is a perspective view showing an air conditioner according to at least one embodiment.

A comparative example will be described first. A temperature adjusting device of the comparative example blows a conditioned air to an occupant seated on a seat. The temperature adjusting device is provided in a headrest of the seat, and blows out the conditioned air from a vent provided in a front surface of the headrest. The blown air is guided to a neck part of the occupant.

In the comparative example, only the conditioned air is blown out forward from the headrest. There is a case in which the conditioned air that has flowed past the neck part passes through a front of the occupant as it is, and the conditioned air may not be sufficiently supplied to the occupant's face which is sensitive to the thermal sensation. Further, since the conditioned air is supplied only to the neck part, the conditioned air is not supplied to other body parts.

In contrast, the present disclosure provides a vehicular air conditioner capable of improving the comfort of an occupant.

According to an aspect of the present disclosure, a vehicular air conditioner supplies a conditioned air to an occupant seated on a seat provided in a vehicle compartment. The vehicular air conditioner includes an air conditioning unit that generates the conditioned air adjusted in temperature, a first outlet that blows the conditioned air to flow past a neck part of the occupant frontward of the seat, and a second outlet that is provided below the first outlet and blows the conditioned air upward to flow past an armpit part of the occupant. The second outlet blows the conditioned air to merge with the conditioned air blown from the first outlet. The second outlet blows the conditioned air with an airflow volume larger than an airflow volume of the conditioned air from the first outlet such that the conditioned air blown from the second outlet guides the conditioned air blown from the first outlet to flow along a face of the occupant. The second outlet may blow the conditioned air with an airflow speed higher than an airflow speed of the conditioned air from the first outlet such that the conditioned air blown from the second outlet guides the conditioned air blown from the first outlet to flow along a face of the occupant.

According to the above configuration, the conditioned air can be supplied to the neck part of the occupant by the first outlet, and the conditioned air can be supplied to the armpit parts of the occupant by the second outlet. In other words, the conditioned air can be supplied to the neck part and armpit parts in which arteries are concentrated and a temperature adjusting influence of a body is relatively high among body parts of the occupant. The conditioned air from the second outlet is larger in airflow volume than the conditioned air from the first outlet, or the conditioned air from the second outlet is higher in airflow speed than that of the conditioned air from the first outlet. Thus, an air flow of the conditioned air from the first outlet can be guided by an upward flow of the conditioned air from the second outlet such that the conditioned air flows along the face which is a body part relatively sensitive to the thermal sensation. As a result, the air flow can be created such that the occupant can easily feel the conditioned air. As a result, a vehicular air conditioner capable of improving the comfort of an occupant can be provided.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

A vehicular air conditioner according to a first embodiment will be described with reference to FIGS. 1 to 5. Hereinafter, a vehicle width direction of a vehicle is simply referred to as a width direction or a right-left direction. A height direction of the vehicle is simply referred to as a height direction or a vertical direction. A front-rear direction of the vehicle is simply referred to as a longitudinal direction. A vehicular air conditioner 1 includes a first outlet duct 3, a second outlet duct 4, and a refrigeration cycle device 2. The vehicular air conditioner 1 provides a cool feeling or a warm feeling to an occupant by supplying a conditioned air having an adjusted temperature. The vehicular air conditioner 1 cools or heats a body of the occupant by supplying the conditioned air.

The vehicular air conditioner 1 is applied to, for example, an electric vehicle which travels by an electric power of a battery. The vehicular air conditioner is applied, for example, to provide the conditioned air to the occupant in one-person or two-person small electric vehicle. The small electric vehicle is also referred to as a personal mobility, an ultra-small EV, or the like, and has a light weight and a simple configuration as compared with general vehicles. For example, in the small electric vehicle, a vehicle air conditioner which is mounted for conditioning air in the entire vehicle compartment is not mounted in the general vehicles. In other words, in the general vehicles, there is no vehicle air conditioner provided with an air conditioning unit inside the vehicle compartment with respect to a dash panel, and provided with a vehicle exterior heat exchanger for radiating a heat on an engine compartment side or a motor room side with respect to the dash panel. The vehicular air conditioner 1 can be applied to improve the comfort of the occupant in the vehicle having no general vehicle air conditioner as described above.

Figure 2:
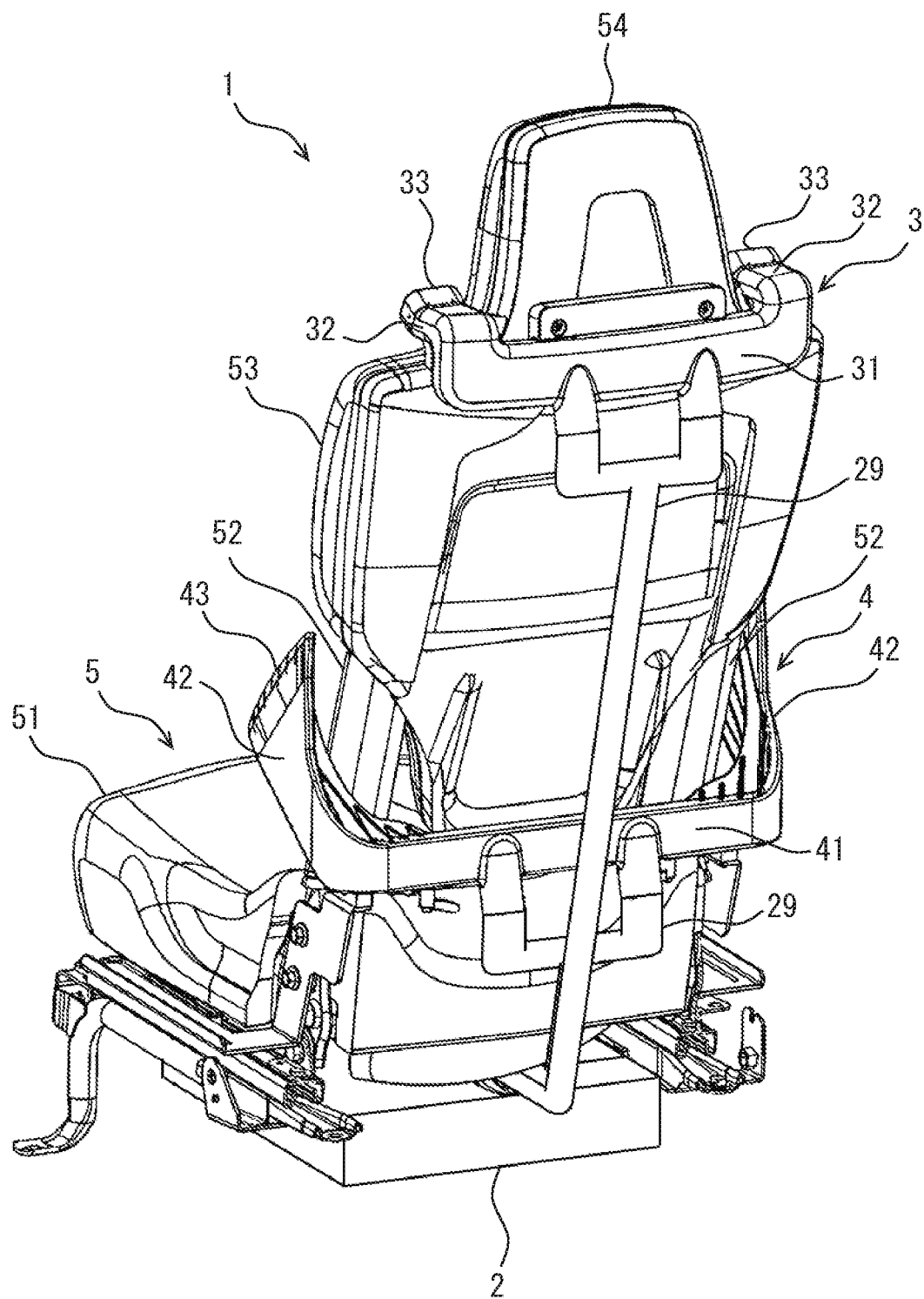
FIG. 2 is a rear perspective view of the air conditioner according to at least one embodiment.

The vehicular air conditioner 1 supplies the conditioned air to the occupant seated on a seat 5. As shown in FIGS. 1 and 2, the vehicular air conditioner 1 is, for example, an air conditioner attached to the seat 5. The seat 5 includes a seat portion 51 for supporting buttocks, thighs, and the like of the occupant as a seated occupant, and a backrest portion 53 for supporting a back of the occupant. The seat 5 includes a headrest portion 54 which supports a head of the occupant. In the seat 5 according to the first embodiment, the headrest portion 54 is formed integrally with the backrest portion 53. Alternatively, the headrest portion 54 may be separated from the backrest portion 53 extending from a lower portion and attached to the backrest portion 53. A width direction (right-left direction) of the seat 5 coincides with the width direction (right-left direction) of the vehicle. A height direction (vertical direction) of the seat 5 coincides with the height direction (vertical direction) of the vehicle. A longitudinal direction of the seat 5 also coincides with the longitudinal direction of the vehicle. The seat 5 is installed so that the seated occupant faces the front of the vehicle. The seat portion 51 is connected to two hollow connecting pipes 52. The seat 5 is configured to be slidable with respect to a floor of the vehicle compartment. The refrigeration cycle device 2 is installed below the seat portion 51.

Figure 3:
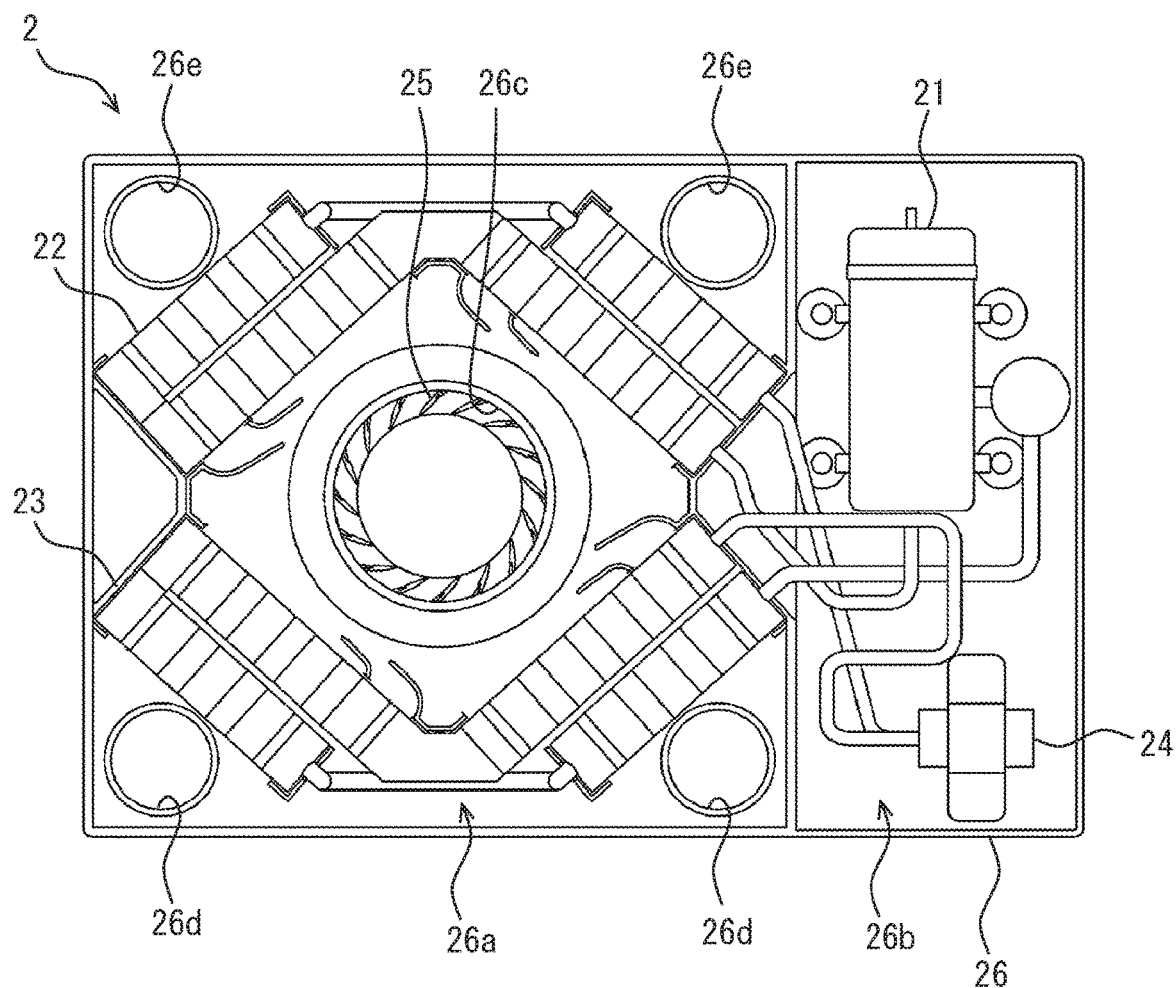
FIG. 3 is a view showing a refrigeration cycle device.
Figure 4:
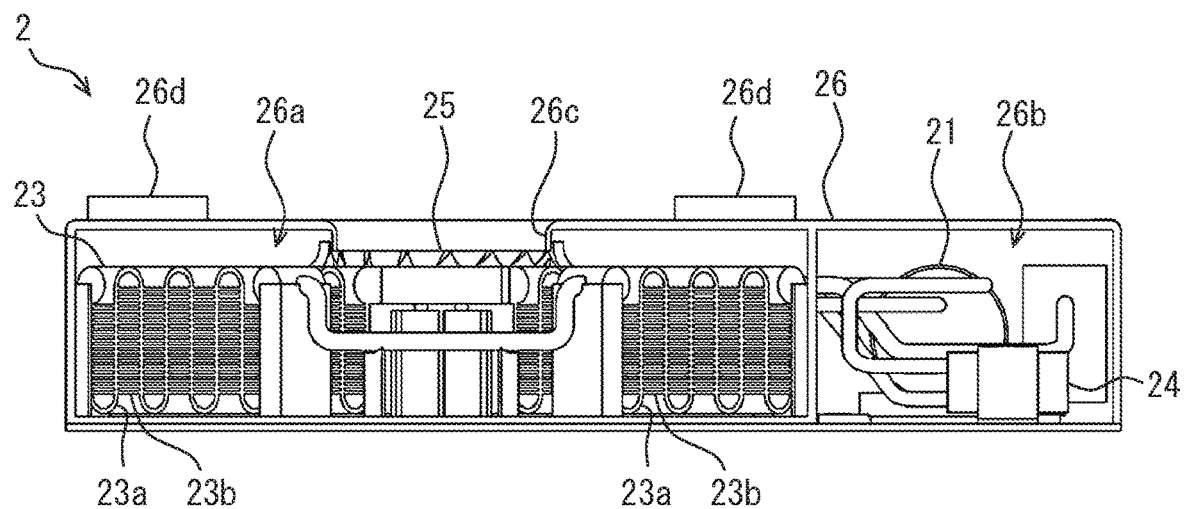
FIG. 4 is a side view of the refrigeration cycle device.

As shown in FIGS. 3 and 4, the refrigeration cycle device 2 includes refrigeration cycle function products including a compressor 21 for pumping a refrigerant, an expansion valve 24 as a pressure reducing device for reducing a pressure of the refrigerant, an evaporator 23, and a condenser 22, and a fan 25 as an outlet for blowing an air to the evaporator 23 and the condenser 22. The refrigeration cycle device 2 blows out the air blown by the fan 25 as a conditioned air whose temperature is adjusted by the evaporator 23 or the condenser 22. In other words, the refrigeration cycle device 2 is an air conditioning unit that generates the conditioned air with the temperature adjusted.

The refrigeration cycle device 2 is accommodated in a housing 26. The refrigeration cycle device 2 is integrally provided inside one housing 26, for example. The housing 26 is disposed below the seat portion 51, that is, between the seat portion 51 and the floor in the vehicle compartment. The housing 26 is accommodated between a pair of seat rails. The housing 26 is fixed to a lower surface of the seat portion 51. In other words, the housing 26 and the refrigeration cycle device 2 accommodated in the housing 26 are slidably movable integrally with the seat 5. The interior of the housing 26 is partitioned into a first accommodation space 26a in which the fan 25, the evaporator 23, and the condenser 22 are disposed, and a second accommodation space 26b in which the compressor 21 and the expansion valve 24 are disposed. A suction port 26c for drawing in an air from the outside, cold air outlet ports 26d for blowing out the air that has passed through the evaporator 23 to the outside, and warm air outlet ports 26e for blowing out the air that has passed through the condenser 22 are provided on the first accommodation space 26a side of the housing 26. The fan 25 is provided in the vicinity of the suction port 26c. The fan 25 is, for example, a centrifugal fan. The fan 25 is disposed substantially at the center of the first accommodation space 26a.

The evaporator 23 and the condenser 22 are, for example, heat exchangers having flat tubes folded back in a meandering manner and fins provided between the tubes folded back and facing each other. The evaporator 23 and the condenser 22 are disposed so as to surround the fan 25 in the first accommodation space 26a. Each of the evaporator 23 and the condenser 22 is configured to exchange a heat with the air blown in a centrifugal direction from one fan 25. The air blown from the fan 25 and passed through the evaporator 23 is cooled and blown out as a cold air from the cold air outlet ports 26d to the outside of the housing 26. The air blown from the fan 25 and passed through the condenser 22 is heated and blown out as a warm air from the warm air outlet ports 26e to the outside of the housing 26.

Each of the cold air outlet ports 26d and the warm air outlet ports 26e are connected so as to communicate with both of one relay duct 29 communicating with the first outlet duct 3 and another relay duct 29 communicating with the second outlet duct 4. Either the cold air from the cold air outlet ports 26d or the warm air from the warm air outlet ports 26e is selectively blown to the first outlet duct 3 and the second outlet duct 4. For example, a switching means (not shown) such as a door or a valve blocks one of the cold air outlet ports 26d and the warm air outlet ports 26e from each of the relay ducts 29, so as to be able to select whether to blow the cold air or supply the warm air to the first outlet duct 3 and the second outlet duct 4.

The first outlet duct 3 has a first rear duct portion 31 extending rearward of the seat 5 and a pair of first side duct portions 32 extending laterally of the seat 5. The first outlet duct 3 is a passage formation member that provides a passage through which the conditioned air blown out from the refrigeration cycle device 2 passes. The first outlet duct 3 is made of, for example, resin. The first outlet duct 3 is attached to the backrest portion 53 of the seat 5. The first outlet duct 3 is mounted in the vicinity of a root of the headrest portion 54 in the backrest portion 53 of the seat 5. The first outlet duct 3 is configured to be detachable from the backrest portion 53 by a fixing tool such as a screw. The first outlet duct 3 is shaped to extend from the rear of the backrest portion 53 to the sides of the headrest portion 54.

The first rear duct portion 31 is a portion of the first outlet duct 3 extending on the back surface of the backrest portion 53. The first rear duct portion 31 is formed so as to extend in the width direction at a height position close to the root of the headrest portion 54, for example. The relay duct 29 is connected to the first rear duct portion 31, and the conditioned air flowing through the relay duct 29 can flow into the interior. The first rear duct portion 31 is longer in the width direction than a width dimension of the headrest portion 54. The pair of first side duct portions 32 are connected to both ends of the first rear duct portion 31.

The first side duct portions 32 are portions of the first outlet duct 3 that extends forward on the sides of the headrest portion 54. The first side duct portions 32 are each formed such that at least an end of the first side duct portion 32 is adjacent to a shoulder portion of the backrest portion 53 and the headrest portion 54. The ends of the first side duct portions 32 extend, for example, in the longitudinal direction to the vicinity of a front surface of the backrest portion 53. First outlet ports 33 are opened at respective ends of the pair of first side duct portions 32. In other words, a pair of the first outlet ports 33 are provided across the headrest portion 54. The first outlet ports 33 open forward. The first outlet ports 33 each have a blowing direction set so that the blown conditioned air flows past the neck part of the occupant seated. In other words, the first outlet ports 33 blow the conditioned air toward the neck of the occupant. The first outlet ports 33 correspond to a first outlet.

The first outlet ports 33 are opened in the vicinity of the root of the headrest portion 54. The first side duct portions 32 extend obliquely upward in the vicinity of, for example, the first outlet ports 33. In other words, the first outlet ports 33 are provided to blow out the conditioned air obliquely upward. In this example, the term "obliquely upward" means a direction having a predetermined elevation angle with respect to the horizontal plane. In other words, the first outlet ports 33 are provided so that the blown conditioned air flows forward while directing obliquely upward. Therefore, a flow of the conditioned air blown out from the first outlet ports 33 is easily changed upward as compared with the case where the conditioned air flows horizontally or obliquely downward.

Inside each of the first outlet ports 33, a vertical louver for adjusting an orientation of the blowing conditioned air in the vertical direction and a lateral louver for adjusting an orientation in the right-left direction are provided. The lateral louvers are oriented so that the conditioned air is directed to the center of the seat 5 in the right-left direction. In other words, the lateral louver in the first outlet port 33 positioned to the right of the seat 5 is set to blow out the conditioned air obliquely leftward, and the lateral louver in the first outlet port 33 positioned to the left of the seat 5 is set to blow out the conditioned air obliquely rightward. The inclination directions of the respective lateral louvers are set to be symmetrical with each other such that the conditioned airs blown out from the respective first outlet ports 33 merge together in the vicinity of the center of the seat 5 in the right-left direction. The vertical louvers and the lateral louvers may be formed as movable louvers that allow the occupant to arbitrarily change the blowing direction of the conditioned air.

The second outlet duct 4 has a second rear duct portion 41 extending rearward of the seat 5 and a pair of second side duct portions 42 extending laterally of the seat 5. The second outlet duct 4 is shaped so as to extending from the rear of the backrest portion 53 to the sides of the backrest portion 53. The second outlet duct 4 extends around the outside of the connecting pipes 52 on both sides. The second outlet duct 4 is attached to the backrest portion 53 below the first outlet duct 3. Like the first outlet duct 3, the second outlet duct 4 is a passage formation member that provides a passage through which the conditioned air blown from the refrigeration cycle device 2 passes. The second outlet duct 4 is made of, for example, resin.

The second outlet duct 4 is attached to the seat 5. The second outlet duct 4 is fixed to the seat by being connected to a mounting pipe 55 provided behind the connecting pipe 52 in the seat 5 and extending in the width direction, for example. The second outlet duct 4 is configured to be rotatable about, for example, the mounting pipe 55. As a result, the blowing angle of the second outlet duct 4 can be arbitrarily adjusted by the occupant.

The second rear duct portion 41 is a portion of the second outlet duct 4 extending on the rear surface of the backrest portion 53. The relay duct 29 is connected to the second rear duct portion 41, and the conditioned air flowing through the relay duct 29 can flow into the inside. The second rear duct portion 41 is longer in the width direction than the width dimension of the backrest portion 53 at the height position where the second rear duct portion 41 is attached. A pair of second side duct portions 42 are connected to both ends of the second rear duct portion 41.

The second side duct portions 42 are portions of the second outlet duct 4 that extends forward on the sides of the backrest portion 53. The second side duct portions 42 are adjacent to the side portions of the backrest portion 53 across the connecting pipe 52. The second side duct portions 42 are thus also close to the connecting pipe 52. The second side duct portions 42 are each formed to have a flat shape in the width direction. The second side duct portions 42 extend obliquely upward. Second outlet ports 43 are opened at the respective ends of the pair of second side duct portions 42. In other words, a pair of the second outlet ports 43 are provided on both sides of the seat 5. The second outlet ports 43 are positioned below the first outlet ports 33 in the height direction. The second outlet ports 43 open forward and obliquely upward. In other words, the second outlet ports 43 blow out the conditioned air from lower portions of the first outlet ports 33 forward and obliquely upward. The second outlet ports 43 correspond to a second outlet.

The second outlet ports 43 each have a blowing position and a blowing angle set so that the blown conditioned air flows past the armpit parts of the occupant. In other words, the second outlet ports 43 are configured to blow out the conditioned air toward the armpit parts of the occupant. In this example, the armpit parts are, for example, lateral side portions of an upper body facing upper arms in a standing posture in which the arms are suspended. For example, the second outlet ports 43 are provided in the second side duct portions 42 extending on the sides of the backrest portion 53, so that the conditioned air is blown out from positions closer to the armpit parts of the occupant seated on the seat 5. For example, since the second outlet ports 43 are opened on a front side than the backrest portion 53 in the longitudinal direction, the second outlet ports 43 are opened on the sides of an upper body of the occupant seated on the seat 5, and the conditioned air immediately after blowing out from the second outlet ports 43 is configured to surely flow past the armpit parts of the occupant. The longitudinal positions of the second outlet ports 43 are set so as not to open on the front side than the occupant. For example, the second outlet ports 43 are opened on the front side than the backrest portion 53 in the longitudinal direction and on a rear half side of the seat portion 51.

In addition, the blowing position and the blowing angle of the second outlet ports 43 are set so that the blown conditioned air merges with the conditioned air blown out from the first outlet ports 33 in the vicinity of the front of the neck part or the face of the occupant. The second outlet ports 43 blows out the conditioned air forward and obliquely upward, thereby merging with the conditioned air from the first outlet ports 33 in a height range including the neck or face of the occupant in a height direction in front of the neck or face of the occupant in the longitudinal direction. In order to surely merge with the conditioned air from the first outlet ports 33 in the above range, the second outlet ports 43 are provided so that the outlet ports 43 have, for example, a blowing angle of 45 degrees or more in an elevation angle. The second outlet ports 43 are formed so that the blowing angle with respect to the horizontal plane of the second outlet ports 43 is larger than the blowing angle with respect to the horizontal plane of the first outlet ports 33 so as to surely merge with the conditioned air from the first outlet ports 33.

The pair of second outlet ports 43 are provided so as to be located outside the pair of first outlet ports 33 in the width direction. The pair of second outlet ports 43 are inclined toward the center of the seat 5 in the width direction to blow out the conditioned air. In other words, the second outlet ports 43 are provided so that the blowing angle of the second outlet ports 43 is inclined toward the center side of the seat 5 with respect to the longitudinal direction. In other words, an end of the second side duct portions 42 is provided so as to extend while being inclined toward the center side of the seat 5 with respect to the longitudinal direction. The pair of second outlet ports 43 are provided so that the air blowing angle is symmetrical with respect to the width direction across the seat. In other words, the second outlet ports 43 are a pair of outlet ports provided at positions symmetrical with respect to the longitudinal direction of the seat 5, and the opening direction of the second outlet ports 43 is set so as to be inclined toward the center of the seat 5 in the longitudinal direction and open in a laterally symmetrical manner. As a result, the second outlet ports 43 are inclined symmetrically toward the center of the seat 5 in the right-left direction to blow out the conditioned air. In other words, the conditioned air blown out from each of the pair of second outlet ports 43 can merge at a position corresponding to the vicinity of the center of the seat 5 where the face of the occupant is easily positioned in the right-left direction.

The airflow volume of the conditioned air blown out from the second outlet ports 43 is set to be larger than the airflow volume of the conditioned air blown out from the first outlet ports 33. For example, the passage cross-sectional area, the passage shape, and the like of each of the outlet duct 3 and 4 are designed so that a pressure loss in the second outlet duct 4 becomes smaller than the pressure loss in the first outlet duct 3. Further, when the refrigeration cycle device 2 is provided below the seat portion 51, since the second outlet duct 4 is closer to the refrigeration cycle device 2 than the first outlet duct 3, a distance that the conditioned air directed to the second outlet duct 4 passes through is longer than the conditioned air directed to the first outlet duct 3. A difference in the airflow volume may be set by the difference in the distance.

An airflow speed of the conditioned air blown out from the second outlet ports 43 is set to be larger than an airflow speed of the conditioned air blown out from the first outlet ports 33. In particular, the second outlet ports 43 are set so as to be able to blow out the conditioned air at an airflow speed of the degree which can maintain a higher airflow speed than the conditioned air from the first outlet ports 33 even when the conditioned air from the second outlet ports 43 merges with the conditioned air from the first outlet ports 33. For example, the second outlet ports 43 are provided such that the opening area of the second outlet ports 43 is smaller than the opening area of the first outlet ports 33 so that the airflow speed of the blown conditioned air is larger than the airflow speed of the conditioned air blown out by the first outlet ports 33. The second side duct portions 42 of the second outlet duct 4 are provided so that the passage cross-sectional area of the second side duct portions 42 becomes smaller toward the second outlet ports 43. In particular, the second side duct portions 42 of the second outlet duct 4 are provided so that the passage cross-sectional area of the second side duct portions 42 becomes smaller as the dimension of the second side duct portions 42 in the width direction becomes smaller than that of the first side duct portions 32 of the first outlet duct 3 toward the second outlet ports 43.

Next, the operation of the vehicular air conditioner 1 will be described. The vehicular air conditioner 1 is operated, for example, when the occupant turns on an operation switch. In this example, a case in which a cold air is blown out as the conditioned air will be described.

When the vehicular air conditioner 1 starts operating, the compressor 21 of the refrigeration cycle device 2 starts pumping the refrigerant, and the fan 25 starts rotating. The refrigerant that has been pumped by the compressor 21 and passed through the expansion valve 24 flows through the evaporator 23 in a low temperature state. The rotating fan 25 suctions an air from the outside of the housing 26 into the interior of the housing 26, and blows the air in the centrifugal direction in the first accommodation space 26a. Among the air blown in the centrifugal direction, the air passing through the evaporator 23 exchanges a heat with the refrigerant through the evaporator 23. As a result, the air passing through the evaporator 23 is cooled and blown out as a cold air from the cold air outlet ports 26d to the outside of the housing 26. The cold air blown out from the refrigeration cycle device 2 flows through a connection duct, and then flows into the first outlet duct 3 and the second outlet duct 4.

First, the cold air flowing into the first outlet duct 3 will be described. The cold air flowing into the first outlet duct 3 flows inside the first outlet duct 3 toward each of the pair of first outlet ports 33, and is blown out from the first outlet port 33 toward the front of the seat 5. Since the cold air blown out from the first outlet ports 33 is blown out to the front of the seat 5 from the side of the headrest portion 54 above the shoulder portion of the backrest portion 53, the cold air flows past the neck part of the occupant seated on the seat 5 and reaches the front of the occupant.

Next, the cold air flowing into the second outlet duct 4 will be described. The cold air flowing into the second outlet duct 4 flows inside the second outlet duct 4 toward each of the pair of second outlet ports 43, and is blown out obliquely upward of the seat 5 from the second outlet ports 43. Since the cold air blown out from the second outlet ports 43 is blown out from the front of the backrest portion 53, the cold air flows past the armpit parts of the occupant seated on the seat 5 and reaches the front of the occupant.

The cold air blown out from the second outlet ports 43 merges with the cold air blown out from the first outlet ports 33 in the vicinity of the front surface of the face of the occupant. Since the airflow volume of the cold air blown out from the second outlet ports 43 is larger than the airflow volume of the cold air blown out from the first outlet ports 33, a flow of the cold air from the first outlet ports 33 proceeding forward of the seat 5 is changed to a flow proceeding upward.

As described above, a flow direction of the cold air blown out from the first outlet ports 33 is changed by the cold air blown out from the second outlet ports 43 from a flow direction flowing past the neck of the occupant and proceeding forward into a flow direction flowing upward in front of the face of the occupant, i.e., a flow direction flowing along the face of the occupant.

Figure 5:
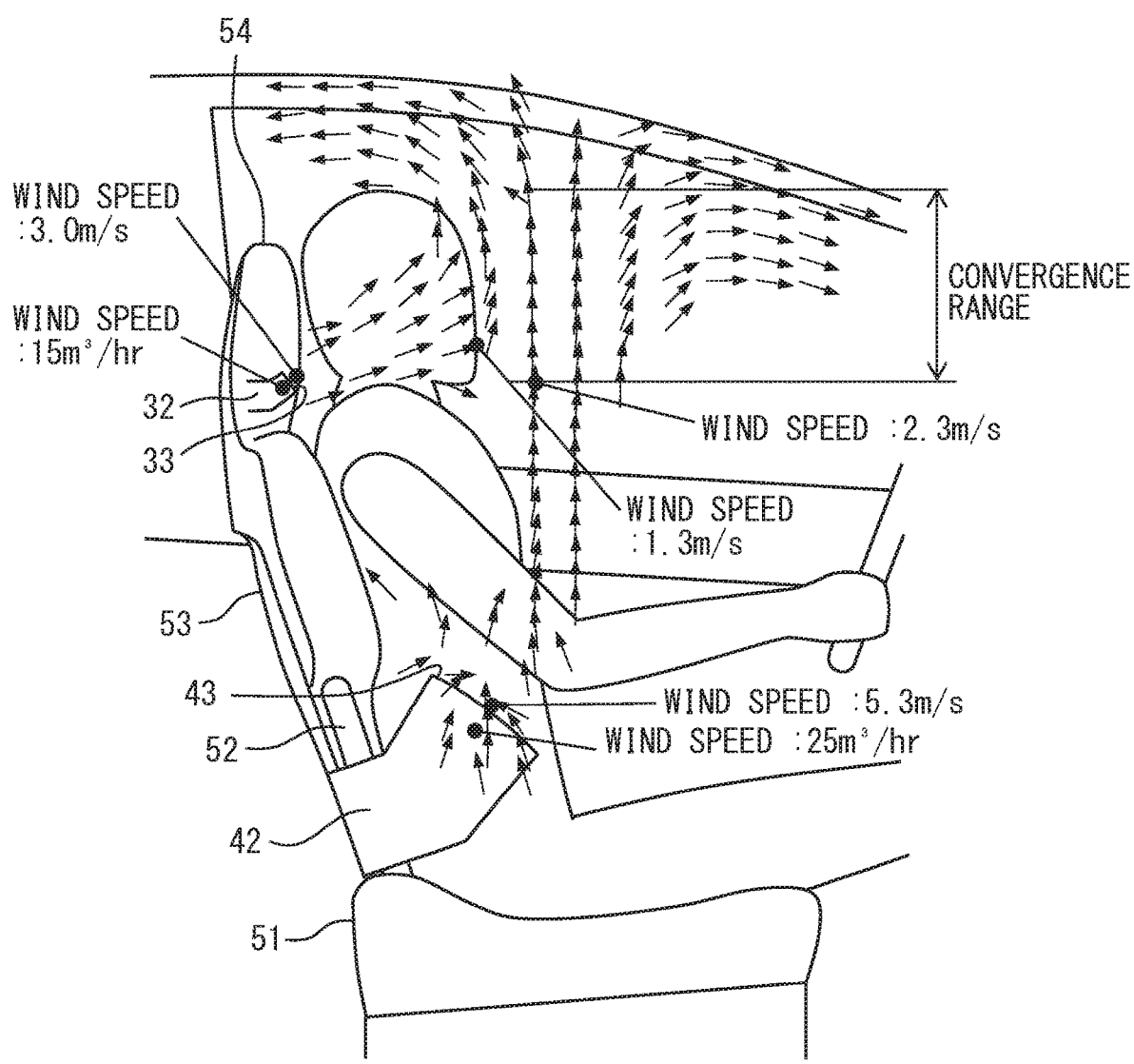
FIG. 5 is a diagram showing results of flow analysis.

FIG. 5 is a diagram showing a result of flow analysis in the vehicular air conditioner 1 according to the first embodiment. In FIG. 5, the first outlet duct 3 and the second outlet duct 4 are illustrated only in the vicinity of the first outlet ports 33 and the second outlet ports 43, that is, in the respective side duct portions 32 and 42, and the respective rear duct portions 31 and 41 are omitted. As shown in FIG. 5, the conditioned air blown out from the first outlet ports 33 flows past the neck part of the occupant and flows toward the front of the seat 5. The conditioned air blown out from the second outlet ports 43 proceeds obliquely upward and flows past the armpit parts of the occupant. The conditioned air that has passed through the armpit parts moves in the vicinity of the front of the occupant and merges with the conditioned air from the first outlet ports 33. The conditioned air from the first outlet ports 33 and the conditioned air from the second outlet ports 43 merge in a convergence range in the height direction shown in FIG. 5, for example.

In this example, for example, the blowing direction of the second outlet ports 43 is set such that the blown conditioned air merges with the conditioned air from the first outlet ports 33 in the height direction above an upper end of the backrest portion 53. Among the "conditioned air from the first outlet ports 33" in the above description, the conditioned air flowing obliquely downward with respect to the horizontal plane by flowing along an upper chest from the shoulder of the occupant or the like may merge with the conditioned air from the second outlet ports 43 below the upper end of the backrest portion 53. In other words, among the conditioned air blown out from the first outlet ports 33, the conditioned air flowing parallel to the horizontal plane or obliquely upward with respect to the horizontal plane merges with the conditioned air from the second outlet ports 43 above the upper end of the backrest portion 53.

The blowing direction of the second outlet ports 43 is set such that, for example, at least a part of the blown conditioned air merges with the conditioned air from the first outlet ports 33 in a height range in which the headrest portion 54 is installed in the height direction. The blowing direction of the second outlet ports 43 is set so that the blown conditioned air converges with the conditioned air from the first outlet ports 33 above the shoulder of the occupant in the height direction.

The blowing direction of the second outlet ports 43 is set so that the blown conditioned air merges with the conditioned air from the first outlet ports 33 in the front of the headrest portion in the longitudinal direction and further in the front of the face of the occupant.

The pair of second outlet ports 43 blow out the conditioned air toward the center of the seat 5 from the outside in the width direction of the pair of first outlet ports 33. For that reason, the conditioned air from the first outlet ports 33 is concentrated at the center of the seat 5 in the width direction, that is, at a position where the face of the occupant is easily positioned, and the conditioned air from the first outlet ports 33 is prevented from spreading in the width direction.

In this example, the airflow volume of the conditioned air blown out from each of the pair of first outlet ports 33 is 15 m$^3$/hr, and the airflow volume of the conditioned air blown out from each of the pair of second outlet ports 43 is 25 m$^3$/hr. In other words, the airflow volume of the conditioned air blown out from the second outlet ports 43 is larger than the airflow volume of the conditioned air from the first outlet ports 33. Further, the airflow speed of the conditioned air blown out from the first outlet ports 33 is 3.0 m/s, and the airflow speed of the conditioned wind blown out from the second outlet ports 43 is 5.3 m/s. In a region in the vicinity where the respective conditioned airs merge with each other, the airflow speed of the conditioned air blown out from the first outlet ports 33 is 1.3 m/s, and the airflow speed of the conditioned air blown out from the second outlet ports 43 is 2.3 m/s.

Therefore, since the conditioned air blown out from the first outlet ports 33 is smaller in airflow volume than the conditioned air blown out from the second outlet ports 43, the direction of air flow is guided upward in the vicinity of the face of the occupant. Further, since the conditioned air blown out from the first outlet ports 33 is smaller in airflow speed than the conditioned air blown out from the second outlet ports 43, the air flow is guided more reliably. As described above, the direction of the conditioned air blown out from the first outlet ports 33 is changed by the conditioned air blown out from the second outlet ports 43, and the conditioned air flows along the face of the occupant. Further, since the conditioned air blown out from the second outlet ports 43 also passes in the vicinity of the face of the occupant, the airflow volume of the conditioned air passing in the vicinity of the face of the occupant is increased correspondingly.

Next, the operation and effects of the vehicular air conditioner 1 according to the first embodiment will be described. The vehicular air conditioner 1 includes a refrigeration cycle device 2 that is an air conditioning unit that generates a conditioned air with temperature adjusted. The vehicular air conditioner 1 includes a first outlet ports 33 for blowing the conditioned air so as to flow past the neck part of the occupant toward the front of the seat 5. The vehicular air conditioner 1 includes second outlet ports 43 which are provided below the first outlet ports 33 and which blows the conditioned air upward, and which blows the conditioned air so as to flow past the armpit parts of the occupant and merge with the conditioned air blown out from the first outlet ports 33. The second outlet ports 43 blow out the conditioned air with an airflow volume larger than that of the first outlet ports 33, and guides the conditioned air blown out from the first outlet ports 33 so as to flow along the face of the occupant.

According to the above configuration, the conditioned air can be supplied to the neck part of the occupant by the first outlet ports 33, and the conditioned air can be supplied to the armpit parts of the occupant by the second outlet ports 43. In other words, the conditioned air can be supplied to the neck part and the armpit parts, which are parts in which arteries are concentrated and a temperature adjusting effect of a body is relatively high, among body parts of the occupant. Then, the air flow of the conditioned air from the first outlet ports 33 is changed by the conditioned air from the second outlet ports 43, and the conditioned air can be supplied to the face, which is a body part having a relatively sensitive thermal sensation, by the air flow in which the conditioned air from the second outlet ports 43 and the conditioned air from the first outlet ports 33 are combined. As a result, the air flow in which the occupant can easily feel the conditioned air can be provided. As described above, the vehicular air conditioner 1 capable of improving the comfort of the occupant can be provided.

In addition, the vehicular air conditioner 1 can form the air flow along the face by the air flow flowing past the neck part and the air flow flowing past the armpit parts of the occupant. For that reason, there is no need to newly provide an outlet port for blowing out the conditioned air flowing along the face in addition to the first outlet ports 33 and the second outlet ports 43. Therefore, a power of the refrigeration cycle device 2 can be controlled because there is no need to blow the air to other than the first outlet ports 33 and the second outlet ports 43. Therefore, air conditioning comfortable for the occupant can be realized with a smaller power consumption amount. In addition, the vehicular air conditioner 1 blows out the conditioned air for an occupant seated on a seat instead of the entire vehicle compartment. Therefore, since the vehicular air conditioner 1 does not need to perform air conditioning for the purpose of adjusting the temperature of the entire vehicle compartment, air conditioning comfortable for the occupant can be realized while controlling the power of the refrigeration cycle device 2 in this respect as well.

The second outlet ports 43 guides the conditioned air blown from the first outlet ports 33 to flow along the face of the occupant with the conditioned air having a higher airflow speed than that of the conditioned air blown from the first outlet ports 33. According to the above configuration, the conditioned air blown out from the second outlet ports 43 merges with the conditioned air blown out from the first outlet ports 33 at an airflow speed higher than that of the conditioned air blown out from the first outlet ports 33. For that reason, the air flow of the conditioned air from the first outlet ports 33 can be guided by the conditioned air from the second outlet ports 43 which is directed from the lower side to the upper side at the time of merging so as to flow along the face which is a body part in which the sense of heat is relatively sensitive. In particular, in the vehicular air conditioner 1 according to the first embodiment, in a state where both the airflow volume and the airflow speed of the conditioned air blown out from the second outlet ports 43 are larger than those of the conditioned air blown out from the first outlet ports 33, the conditioned air from the second outlet ports 43 merges with the conditioned air from the first outlet ports 33. For that reason, the conditioned air blown out from the first outlet ports 33 can be more reliably guided to flow upward, that is, to flow along the face of the occupant.

The first outlet duct 3 and the second outlet duct 4 are detachably attached to the seat 5. According to the above configuration, the first outlet duct 3 and the second outlet duct 4 can be attached to the seat 5 afterwards.

The first outlet ports 33 are provided so as to open above the backrest portion 53 and on the sides of the headrest portion 54. According to the above configuration, the first outlet ports 33 can blow out the conditioned air from a position closer to the neck part of the seated occupant. Therefore, the conditioned air can be supplied to the neck part in a more concentrated manner, so that the comfort of the occupant can be further improved. In addition, since the first outlet ports 33 is provided close to the upper portion of the backrest portion 53 and the side portions of the headrest portion 54, the conditioned air can be more reliably supplied to the neck part of the occupant.

The second outlet duct 4 has the second side duct portions 42 provided on the sides of the backrest portion 53 of the seat 5, and blows the conditioned air from the second outlet ports 43 provided on the second side duct portions 42. According to the above configuration, the second outlet ports 43 blows out the conditioned air from the sides of the backrest portion 53 of the seat 5. In other words, the conditioned air can be blown out at a position relatively close to the first outlet ports 33. For that reason, the airflow speed of the conditioned air blown out from the second outlet ports 43 is unlikely to decrease until the conditioned air merges with the conditioned air blown out from the first outlet ports 33. Therefore, the air flow of the conditioned air blown out from the first outlet ports 33 is more easily changed.

The second outlet ports 43 are opened on the front side than the backrest portion 53 in the longitudinal direction. According to the above configuration, the second outlet ports 43 can blow out the conditioned air at positions closer to the armpit parts of the occupant.

The second outlet ports 43 are outlet ports that open on a lower half side of the backrest portion 53 in the height direction. According to the above configuration, since the second outlet ports 43 are provided in a height range equivalent to that of the backrest portion 53 in the height direction, the second outlet ports 43 can blow out the conditioned air from positions relatively close to the first outlet ports 33. In addition, since the second outlet ports 43 are opened on the lower half side of the backrest portion 53, the elevation angle of the blowing angle is easily set to be larger. As a result, the conditioned air that has flowed past the armpit parts can be set to be closer to the face of the occupant. This makes it possible to change the air flow of the conditioned air from the first outlet ports 33 to a flow along the face of the occupant.

The air conditioning unit is provided by the refrigeration cycle device 2. This makes it possible to adjust the temperature of the conditioned air by using a refrigeration cycle having a relatively high cooling capacity. This makes it easier to provide the occupant with a cold feeling or a warm feeling due to the conditioned air.

The refrigeration cycle device 2 is accommodated in a housing 26. The housing 26 is attached to the seat 5. According to the above configuration, since the refrigeration cycle device 2 is fixed to the seat 5, relative positions of the first outlet duct 3 and the second outlet duct 4 and the refrigeration cycle device 2 do not change even if the seat 5 slides. Therefore, there is no need to take into account a relative positional deviation due to the sliding of the seat 5 in the connection between each of the outlet duct 3 and 4 and the refrigeration cycle device 2, and the configuration can be simplified accordingly.

The housing 26 is attached to the seat portion 51 below the seat portion 51. This makes it possible to effectively utilize a space between the seat portion 51 and the floor portion in the vehicle compartment for accommodating the refrigeration cycle device 2.

The vehicular air conditioner 1 is applied to an electric vehicle. Since the vehicular air conditioner 1 can provide comfortable air conditioning to the occupant with less power consumption, the consumption of the battery required for driving in the electric vehicle can be reduced. Therefore, the effect of reducing the power consumption can be further increased by applying the method to an electric vehicle.

The vehicular air conditioner 1 is only one air conditioner in the vehicle compartment. This makes it possible to provide an air conditioner which consumes relatively little power and is comfortable for the occupant in a vehicle, such as a personal mobility, which does not have any other air conditioning unit.

Figure 6:
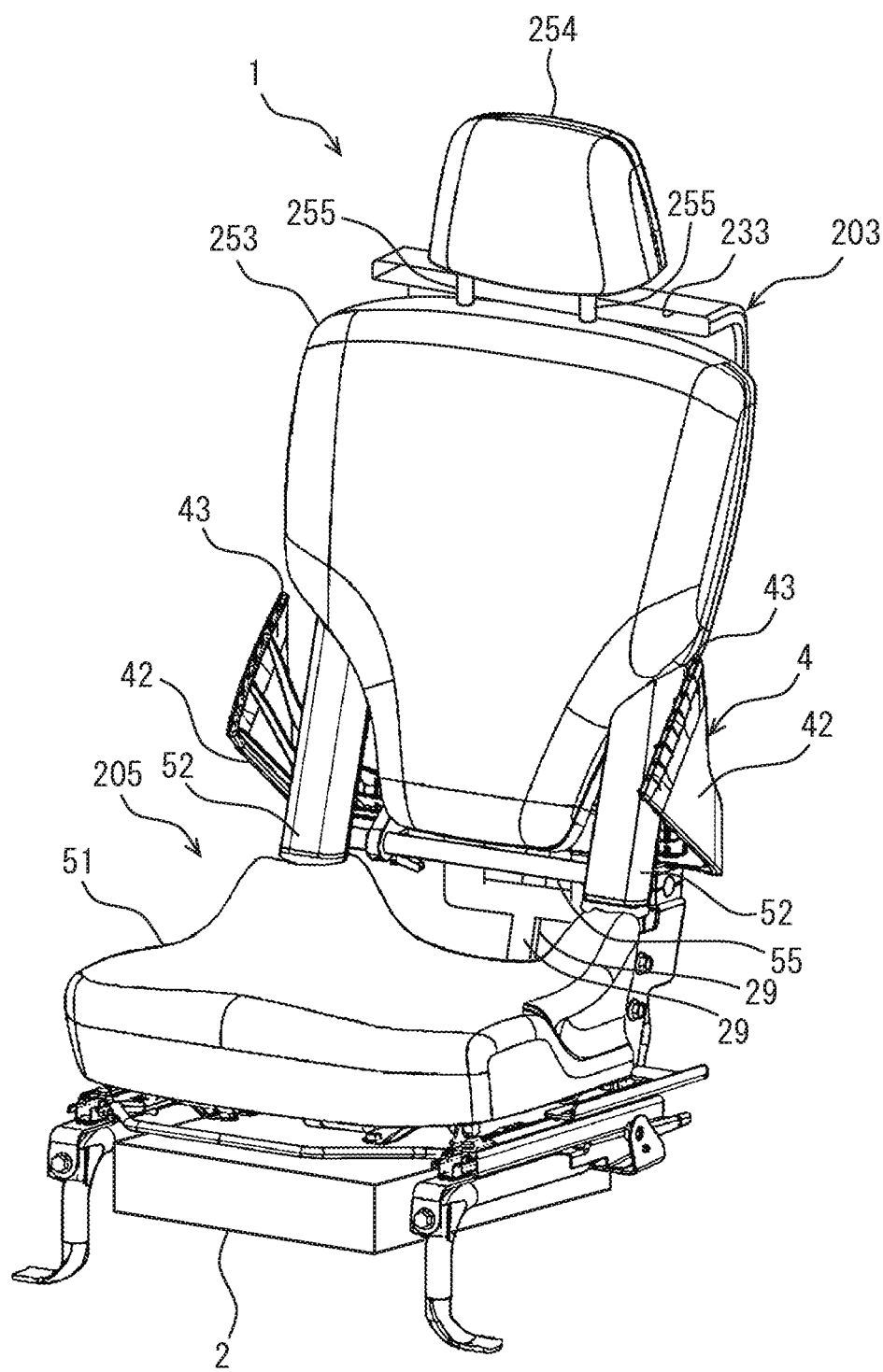
FIG. 6 is a perspective view showing an air conditioner according to at least one embodiment.

In a second embodiment, a modification of the vehicular air conditioner 1 according to the first embodiment will be described. In FIG. 6, components denoted by the same reference numerals as those in the drawings of the first embodiment are similar components and exhibit the same operation and effects.

A vehicular air conditioner 1 according to the second embodiment is different from that in the first embodiment in that a first outlet port 233 is provided between a headrest portion 254 and a backrest portion 253. The vehicular air conditioner 1 according to the second embodiment is applied to a seat 205 having a gap between the backrest portion 253 and the headrest portion 254. The seat 205 has the backrest portion 253 and the headrest portion 254 as separate members. The headrest portion 254 is provided with a stay 255 which is a metal rod extending downward at a lower portion of the headrest portion 254. The stay 255 is inserted into a hole provided in an upper portion of the backrest portion 53. The headrest portion 254 is attached to the backrest portion 253 by inserting the stay 255 into the backrest portion 253. In other words, the headrest portion 254 is connected to the backrest portion 253 by the stay 255. Therefore, a gap is provided between the headrest portion 254 and the backrest portion 253.

The first outlet duct 203 has a wide first outlet port 233 extending in a width direction of the seat 205 at an end of the first outlet duct 203. The first outlet port 233 is opened between the headrest portion 254 and the backrest portion 253 in the vertical direction, for example. The first outlet port 233 opens rearward of the stay 255. The first outlet port 233 has, for example, a dimension in the width direction larger than that of the headrest portion 254 and smaller than that of the backrest portion 253.

The conditioned air blown out from the first outlet duct 203 is blown out forward from a height position between the headrest portion 254 and the backrest portion 253 in the height direction. The height position between the headrest portion 254 and the backrest portion 253 is often about the same as the height position of a neck part of an occupant seated in the seat 205. Therefore, the conditioned air blown out from the first outlet port 233 can more reliably flow past the neck part. In addition, since the conditioned air can be blown from a space between the headrest portion 254 and the backrest portion 253, the airflow volume of the conditioned air supplied to the neck part of the occupant can be more increased. This makes it possible to further improve the comfort of the occupant.

Figure 7:
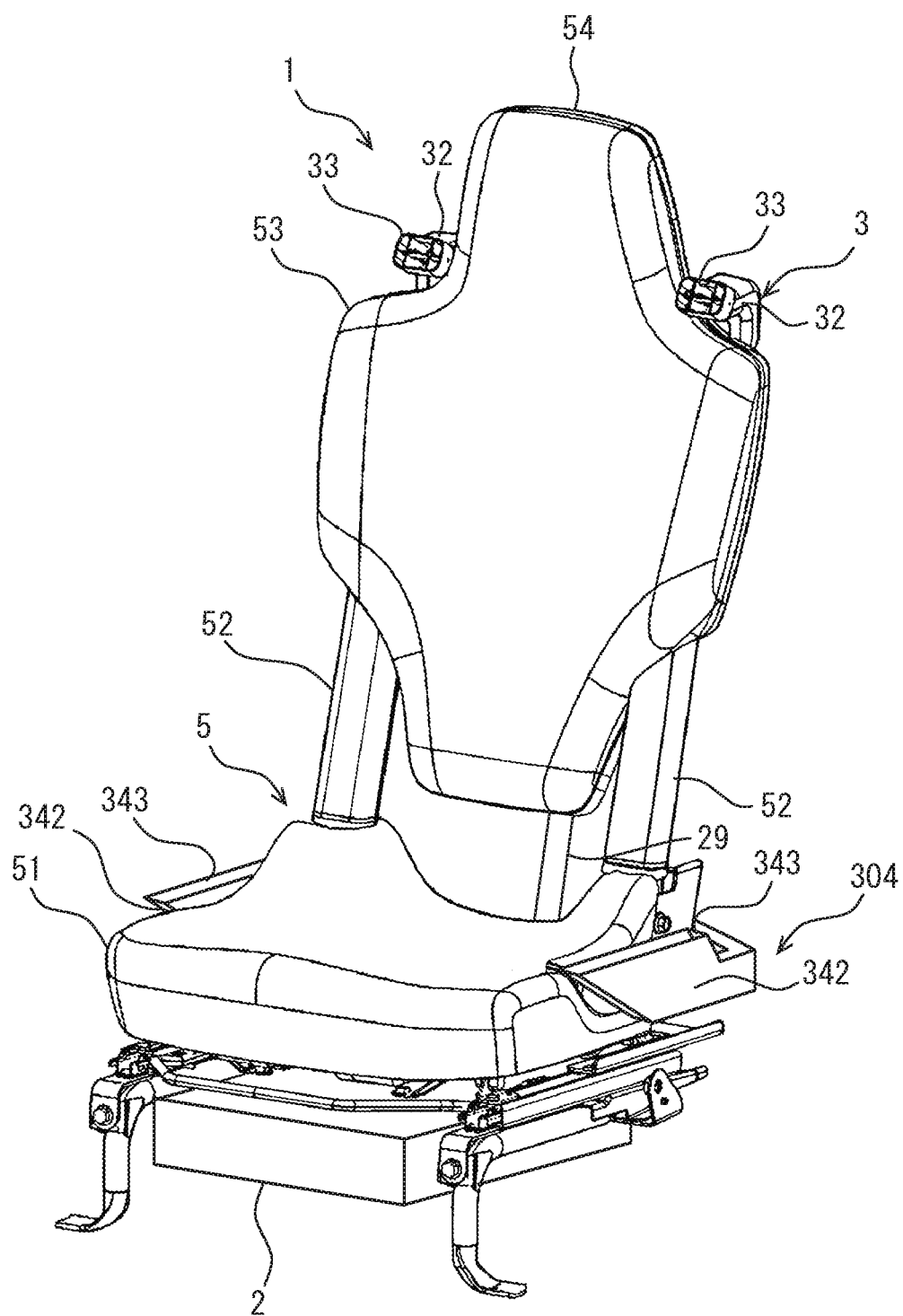
FIG. 7 is a perspective view showing an air conditioner according to at least one embodiment.

In a third embodiment, a modification of the vehicular air conditioner 1 according to the first embodiment will be described. In FIG. 7, components denoted by the same reference numerals as those in the drawings of the first embodiment are similar components and exhibit the same operation and effects.

A vehicular air conditioner 1 according to the third embodiment differs from that of the first embodiment in that a second outlet duct 304 is provided on the side of a seat portion 51. The second outlet duct 304 is, for example, a duct extending from the rear of the seat portion 51 to the side of the seat portion 51. The second outlet duct 304 has, for example, a second outlet port 343 that opens on the side of the seat portion 51. The second outlet port 343 is formed so as to open on the rear side of the seat portion 51 in the longitudinal direction, for example, and has a blowing angle set so as to blow out the conditioned air obliquely upward.

The vehicular air conditioner 1 according to the third embodiment blows the conditioned air from the second outlet duct 304 provided on the side of the seat portion 51. Therefore, an elevation angle of the blowing angle of the second outlet port 343 blowing out the conditioned air to armpit parts of the occupant becomes larger than that in the case of blowing out the conditioned air from the side of the backrest portion 53. In other words, the conditioned air flowing past the armpit parts and passing in the vicinity of the face of the occupant can pass through a position closer to the face. Therefore, the air flow of the conditioned air blown out from the first outlet ports 33 can be changed to an air flow closer to the face of the occupant.

Figure 8:
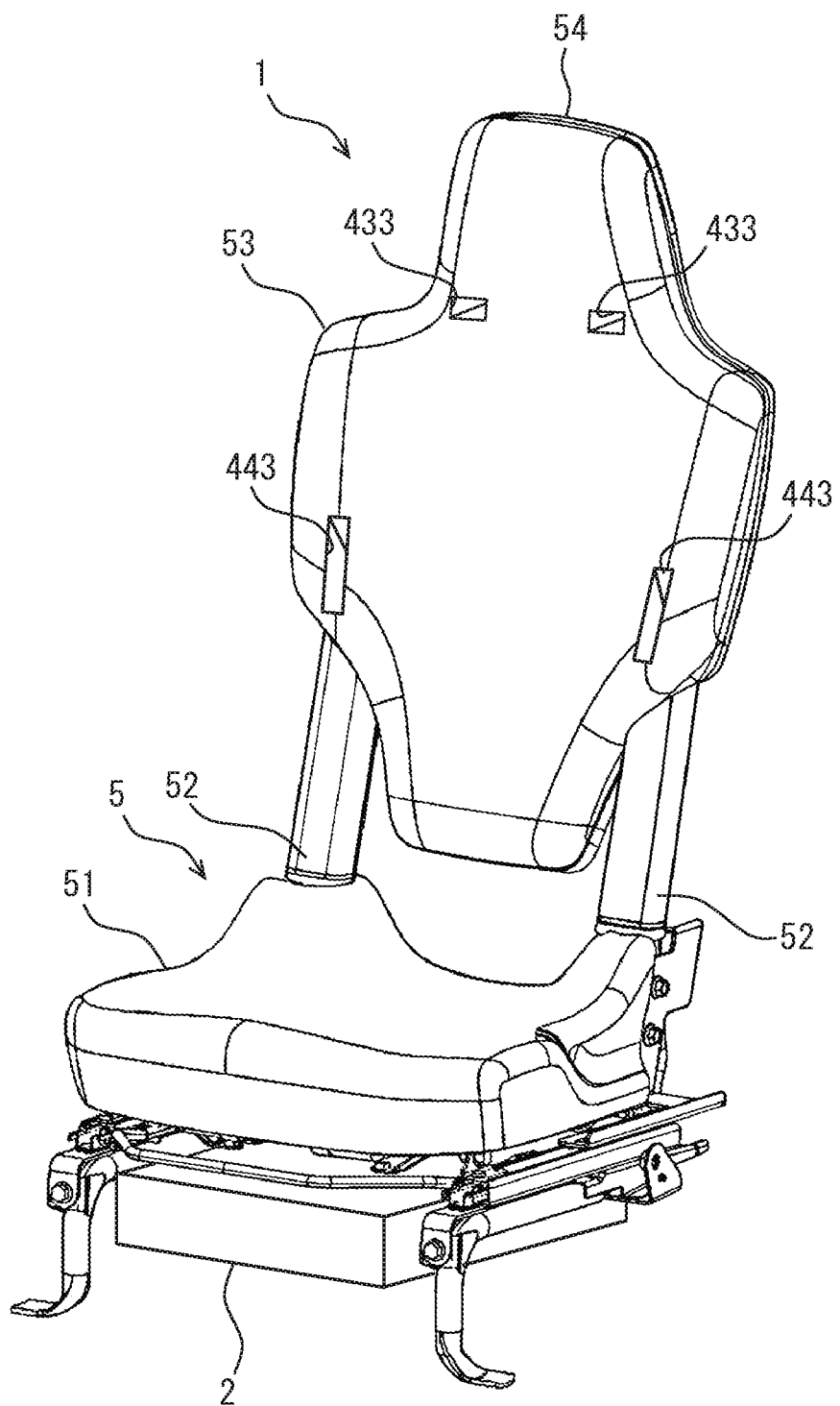
FIG. 8 is a perspective view showing an air conditioner according to at least one embodiment.

In a fourth embodiment, a modification of the vehicular air conditioner 1 according to the first embodiment will be described. In FIG. 8, components denoted by the same reference numerals as those in the drawings of the first embodiment are similar components and exhibit the same operation and effects.

A vehicular air conditioner 1 according to the fourth embodiment differs from that of the first embodiment in that first outlet ports 433 and second outlet ports 443 are provided in a backrest portion 53 of a seat 5. A blowing passage through which a conditioned air blown from the refrigeration cycle device 2 flows is provided in the backrest portion 53. The blowing passage is provided by, for example, a first outlet duct and a second outlet duct embedded inside the backrest portion 53. The blowing passage communicates with, for example, a passage provided inside connecting pipes 52 and inside a seat portion 51. Cold air outlet ports 26d of the refrigeration cycle device 2 communicates with a passage formed inside the seat portion 51. The conditioned air blown out from the cold air outlet ports 26d flows through the passage inside the seat portion 51 and the connecting pipes 52, and then flows through a blowing passage. Alternatively, a configuration may be adopted in which an outlet duct provided at the rear of the backrest portion 53 penetrates the interior of the backrest portion from a back surface of the backrest portion.

The blowing passage communicates with the first outlet ports 433 and the second outlet ports 443. The first outlet ports are opened, for example, in the vicinity of a root of the headrest portion 54. The second outlet ports 443 are open at a front surface of the backrest portion 53. The second outlet ports 443 are opened in the vicinity of both side portions of the backrest portion 53 in the width direction, for example. In other words, the second outlet ports 443 are provided at positions where the second outlet ports 443 can be prevented from being completely blocked by an upper body of the occupant when the occupant is seated. The second outlet ports 443 are provided so as to blow the conditioned air obliquely upward, similarly to the second outlet port 43 in the first embodiment. The second outlet port 443 may be covered with a skin member having air permeability on a surface of the backrest portion 53.

In the vehicular air conditioner 1 according to the fourth embodiment, the second outlet ports 443 are provided in the surface of the backrest portion 53, and the second outlet ports 443 communicate with the blowing passage inside the backrest portion. In other words, since the conditioned air can be thermally insulated from the outside by the backrest portion, a heat insulating property is improved. Further, as compared with the case where the second outlet duct separate from the seat is provided, since a space in the vehicle compartment is not occupied, the degree of freedom of the placement of the other members in the vehicle compartment can be improved. In addition, since the first outlet ducts and the second outlet ducts are not exposed to the outside of the seat, the aesthetics can be improved.

Figure 9:
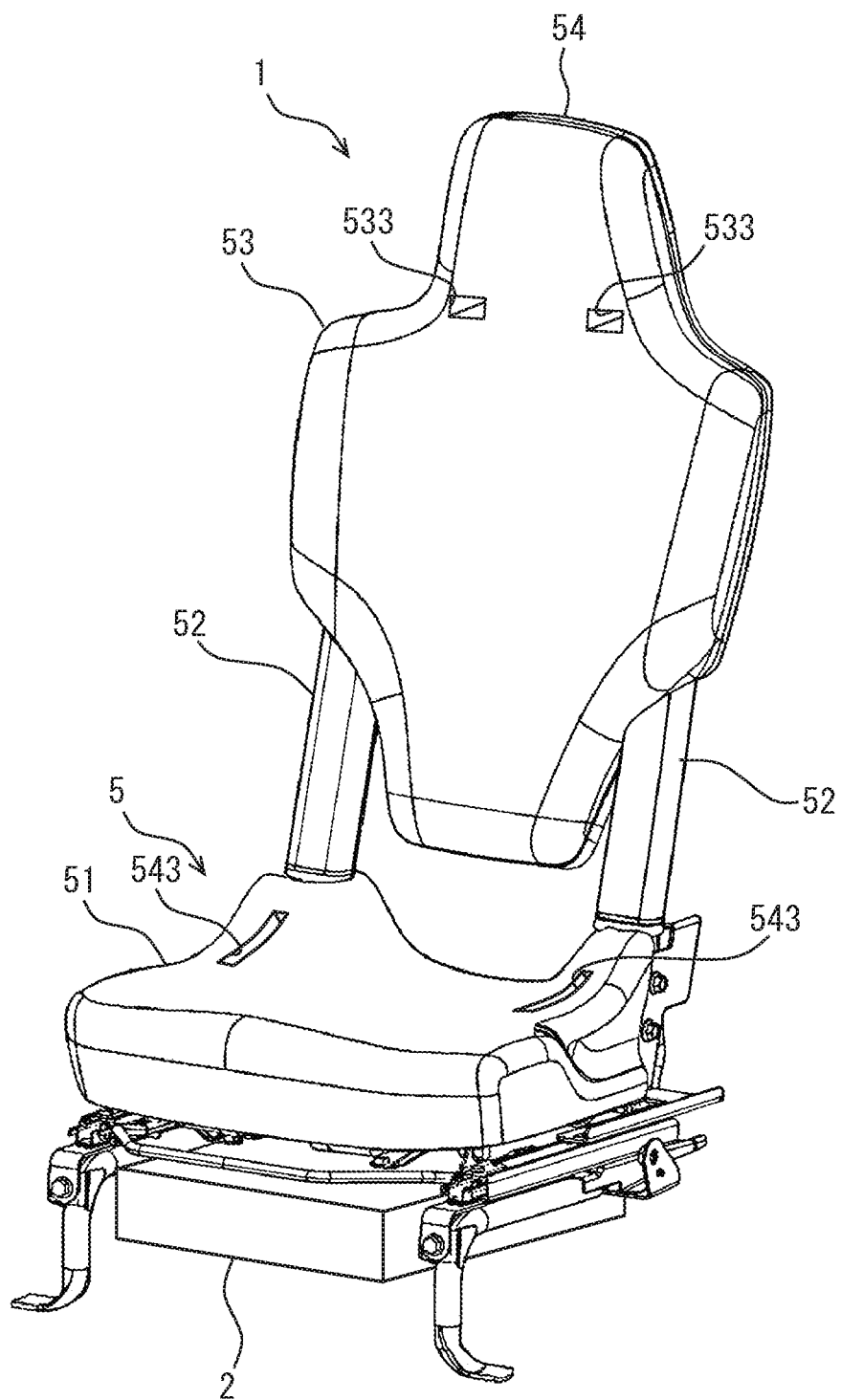
FIG. 9 is a perspective view showing an air conditioner according to at least one embodiment.

A fifth embodiment is a modification of the fourth embodiment. In FIG. 9, components denoted by the same reference numerals as those in the drawings of the first embodiment are similar components and exhibit the same operation and effects. The vehicular air conditioner 1 according to the fifth embodiment differs from that of the fourth embodiment in that second outlet ports 543 are provided in a seat portion 51.

First outlet ports 533 are provided in a backrest portion 53 in the same manner as the first outlet ports 433 of the fourth embodiment. A second outlet duct is embedded in the seat portion 51. At ends of the second outlet duct 543, the second outlet ports 43 are opened. The second outlet ports 543 open in the surface of the seat portion 51. The second outlet ports 543 are opened in the vicinity of both side portions of the seat portion 51 in the width direction. In other words, the second outlet ports 543 are provided at positions where the second outlet ports 543 can be prevented from being completely blocked by an upper body of an occupant when the occupant is seated. The second outlet ports 543 may be covered with a skin member having air permeability on the surface of the seat portion 51.

Figure 10:
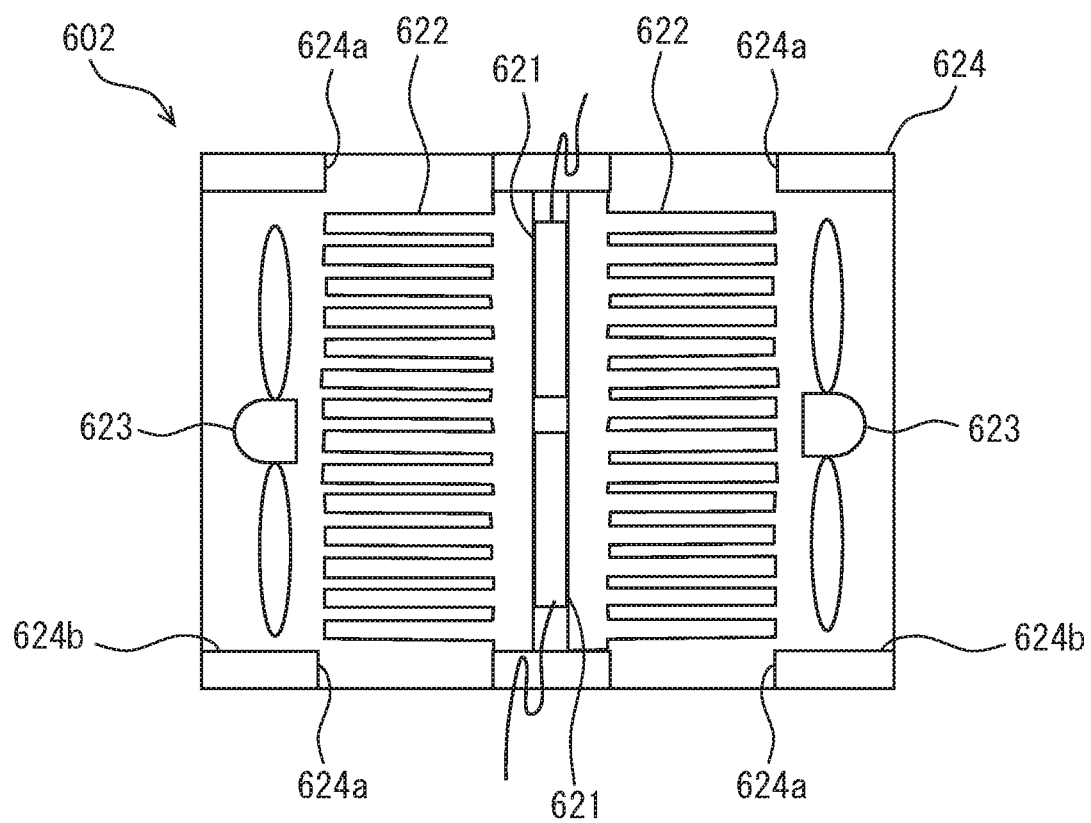
FIG. 10 is a configuration diagram of an air conditioning unit according to at least one embodiment.

In a sixth embodiment, a modification of the vehicular air conditioner 1 according to the first embodiment will be described. In FIG. 10, components denoted by the same reference numerals as those in the drawings of the first embodiment are similar components and exhibit the same operation and effects.

The vehicular air conditioner 1 according to the sixth embodiment differs from the first embodiment in that Peltier elements 621 are used instead of a vapor compression type refrigeration cycle to generate a conditioned air. An air conditioning unit 602 according to the sixth embodiment includes the Peltier elements 621, heat exchanging units 622, and fans 623. The air conditioning unit 602 includes a housing 624 that accommodates the Peltier elements 621, the heat exchanging units 622, and the fans 623. The housing 624 is provided with suction ports 624a through which an air drawn into the housing 624 passes, and outlet ports 624b through which the air blown out from the housing 624 passes.

The Peltier elements 621 are elements utilizing the Peltier effect in which a heat is transferred from one metal to the other when a current flows through a junction of two kinds of metals. The Peltier elements 621 are each formed in a flat plate-like shape, for example, and generate a heat from one surface by energization and absorb a heat from the other surface.

The heat exchanging units 622 are, for example, a pair of heat sinks thermally connected to one surface and the other surface of the Peltier elements 621. The heat exchanging unit 622 connected to one surface of the Peltier elements 621 functions as a heating unit that heats the passing air by a heat generated from the Peltier elements 621. The heat exchanging unit 622 connected to the other surface of the Peltier elements 621 functions as a cooling unit that cools the passing air by heat absorption of the Peltier elements 621.

The fans 623 drive the air in the housing. The fans 623 suction the air into the housing from the suction ports 624a provided in the housing 624, and forms an air flow that passes through the heat exchanging units 622 and is blown out from the outlet ports 624b of the housing 624. The two fans 623 are provided in the housing 624 to drive the air passing through one of the pair of heat exchanging units 622 and the air passing through the other of the pair of heat exchange portions 622. The fans 623 are provided, for example, in the housing 624 on the downstream side of each of the heat exchanging units 622. As the fans 623, various fans such as an axial flow fan and a centrifugal fan can be appropriately employed.

According to the vehicular air conditioner of the sixth embodiment, the air conditioning units 602 generate the conditioned air using the Peltier elements 621. Therefore, the air conditioning unit can be provided which is more space-saving than in the case of using a refrigeration cycle or the like.

The disclosure in the present specification is not limited to the illustrated embodiments. The disclosure encompasses the illustrated embodiments and variations based on the embodiments by those skilled in the art. For example, the present disclosure is not limited to the combinations of components and/or elements shown in the embodiments. The present disclosure may be implemented in various combinations. The present disclosure may have additional portions that may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiments.

In the embodiments described above, the first outlet duct 3 and the second outlet duct 4 are attached to the seat 5. Alternatively, each of the outlet duct 3 and 4 may be attached to a member different from the seat 5 in the vehicle compartment.

In the embodiments described above, the second outlet port is configured to blow out the conditioned air larger in both of the airflow volume and the airflow speed than the first blowing port. Alternatively, the second outlet port may be configured to blow out the conditioned air larger in the airflow volume or the airflow speed than the first blowing port.

In the embodiment described above, it is assumed that the vehicular air conditioner 1 is capable of blowing the air by switching between the cold air and the warm air. Alternatively, only one of the cold air and the warm air may be blown out.

In the embodiment described above, the first outlet ports 33 are provided so as to open on the sides of the seat 5, particularly the headrest portion 54, in the longitudinal direction. Alternatively, the first outlet ports 33 may be provided to open at the rear of the seat 5. The first outlet ports 33 may be provided to open in front of the seat 5. In that case, the first outlet ports 33 are provided at positions close to the front surface of the backrest portion 53 in the longitudinal direction so as not to be positioned forward of the neck part of the seated occupant.

In the embodiment described above, the second outlet ports 43 open forward of the front surface of the backrest portion 53 in the longitudinal direction. Alternatively, the second outlet port 43 may be provided so as to open on the sides or the rear of the backrest portion 53 in the longitudinal direction. In the above configuration, since the second outlet duct 4 does not extend to the sides of the seated occupant, the second outlet duct 4 without giving a sense of compression to the occupant can be provided.

In the embodiment described above, the vehicular air conditioner 1 is applied to an electric vehicle with a single occupant. Alternatively, the vehicular air conditioner 1 may be applied to other types of vehicles. The vehicular air conditioner may be applied to a vehicle with multiple occupants. The vehicular air conditioner 1 may be applied to a vehicle using an internal combustion engine as a driving source, such as an engine vehicle or a hybrid vehicle. Also, the configuration of the seat 5 on which the occupant is seated is not limited to the configuration in which the backrest portion 53 and the seat portion 51 are connected to each other by the connecting pipe 52 exposed to the outside.

In the embodiments described above, the refrigeration cycle device 2 is provided so as to be slidably movable integrally with the seat portion 51 below the seat portion 51. Alternatively, the refrigeration cycle device 2 may be fixed to the floor of the vehicle compartment below the seat portion 51. In that case, it is desirable that the relay duct 29 connecting the refrigeration cycle device 2 and the outlet ducts 3 and 4 has a deformable configuration such as a bellows structure so as to allow the sliding movement of the outlet ducts 3 and 4 together with the seat 5. Since the refrigeration cycle device 2 is fixed to the floor of the vehicle compartment below the seat portion 51, a space between the seat portion 51 and the floor can be effectively utilized, and the transmission of vibration during operation to the seat 5 can be reduced as compared with the case where the refrigeration cycle device 2 is fixed to the seat 5. Further, the refrigeration cycle device 2 may be installed in a place other than the lower portion of the seat portion 51, for example, in a loading platform or the like behind the seat 5. With the installation of the refrigeration cycle device 2 away from the seat 5, the transmission of vibration to the seat 5 during operation and the transmission of noise to the occupant can be more reduced.

In the embodiment described above, in the refrigeration cycle device 2, the refrigeration cycle function products are integrally accommodated in the housing 26. Alternatively, the refrigeration cycle functional products may not be integrally accommodated in one housing 26, but may be installed separately from each other.

In the embodiments described above, the refrigeration cycle device 2 is provided integrally with the seat 5 below the seat portion 51, but may alternatively be attached to the back surface of the backrest portion 53.

In the embodiments described above, the refrigeration cycle device 2 has the expansion valve 24 as the pressure reducing device, but may have a capillary tube instead.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicular air conditioner supplying a conditioned air to an occupant seated on a seat provided in a vehicle compartment, the vehicular air conditioner comprising:
    an air conditioning unit that generates the conditioned air adjusted in temperature;
    a first outlet that blows the conditioned air to flow past a neck part of the occupant frontward of the seat; and
    a second outlet that is provided below the first outlet and blows the conditioned air upward to flow past an armpit part of the occupant, the second outlet blowing the conditioned air to merge with the conditioned air blown from the first outlet, wherein
    the second outlet is configured to blow the conditioned air with an airflow volume larger than an airflow volume of the conditioned air from the first outlet such that the conditioned air blown from the second outlet guides the conditioned air blown from the first outlet to be supplied to a face of the occupant,
    a flow of the conditioned air from the first outlet is substantially parallel to a seat bottom surface of the seat, and
    a flow of the conditioned air from the second outlet is substantially parallel to a seat back surface of the seat.

2. The vehicular air conditioner according to claim 1, wherein the second outlet is an outlet port of an outlet duct provided on a lateral side of a backrest portion of the seat.

3. The vehicular air conditioner according to claim 2, wherein the outlet port is open at a position frontward of the backrest portion.

4. The vehicular air conditioner according to claim 2, wherein the outlet port is open at a position within a lower half of the backrest portion in a height direction.

5. The vehicular air conditioner according to claim 2, wherein the outlet duct is attached to the seat.

6. The vehicular air conditioner according to claim 1, wherein the second outlet is a pair of outlet ports provided at symmetrical positions with respect to a right-left direction of the seat, and the pair of outlet ports are symmetrically inclined toward a center of the seat in the right-left direction to blow the conditioned air.

7. The vehicular air conditioner according to claim 1, wherein the first outlet is an outlet port provided in an outlet duct detachably attached to the seat.

8. The vehicular air conditioner according to claim 1, wherein
    the air conditioning unit is a refrigeration cycle device including:
        a compressor that pumps a refrigerant;
        a condenser through which the refrigerant pumped from the compressor flows;
        a pressure reducing device that depressurizes the refrigerant flowing through the condenser;
        an evaporator through which the refrigerant depressurized by the pressure reducing device flows; and
        a blowing unit that blows an air to the evaporator and the condenser.

9. The vehicular air conditioner according to claim 1, further comprising a housing that accommodates the air conditioning unit, wherein the housing is attached to the seat.

10. The vehicular air conditioner according to claim 9, wherein the housing is attached to a seat portion of the seat and located below the seat portion.

11. The vehicular air conditioner according to claim 1, being applied to an electric vehicle.

12. The vehicular air conditioner according to claim 1, which is only one air conditioner in a vehicle compartment.

13. The vehicular air conditioner according to claim 1, wherein
    the first outlet blows the conditioned air at a first outlet angle with respect to the seat back surface,
    the second outlet blows the conditioned air at a second outlet angle with respect to the seat back surface, and the second outlet angle is more acute and steeper than the first outlet angle.

14. A vehicular air conditioner supplying a conditioned air to an occupant seated on a seat provided in a vehicle compartment, the vehicular air conditioner comprising:
- an air conditioning unit that generates the conditioned air adjusted in temperature;
- a first outlet that blows the conditioned air to flow past a neck part of the occupant front of the seat; and
- a second outlet that is provided below the first outlet and blows the conditioned air upward to flow past an armpit part of the occupant, the second outlet blowing the conditioned air to merge with the conditioned air blown from the first outlet, wherein
- the second outlet is configured to blow the conditioned air with an airflow speed higher than an airflow speed of the conditioned air from the first outlet such that the conditioned air blown from the second outlet guides the conditioned air blown from the first outlet to be supplied to a face of the occupant,
- a flow of the conditioned air from the first outlet is substantially parallel to a seat bottom surface of the seat, and
- a flow of the conditioned air from the second outlet is substantially parallel to a seat back surface of the seat.

* * * * *